US010836295B2

(12) United States Patent
Liffrig et al.

(10) Patent No.: US 10,836,295 B2
(45) Date of Patent: Nov. 17, 2020

(54) ROTATABLE TAILGATE

(71) Applicant: The North American Coal Corporation, Plano, TX (US)

(72) Inventors: David P. Liffrig, Starkville, MS (US); Ernie B. Mills, Louisville, MS (US); David Vaughn, Weir, MS (US)

(73) Assignee: The North American Coal Corporation, Plano, TX (US)

( * ) Notice: Subject to any disclaimer, the term of this patent is extended or adjusted under 35 U.S.C. 154(b) by 33 days.

(21) Appl. No.: 16/261,017

(22) Filed: Jan. 29, 2019

(65) Prior Publication Data

US 2019/0241112 A1    Aug. 8, 2019

Related U.S. Application Data

(60) Provisional application No. 62/709,923, filed on Feb. 5, 2018.

(51) Int. Cl.
*B60P 1/16* (2006.01)
*B60P 1/26* (2006.01)
*B62D 33/037* (2006.01)

(52) U.S. Cl.
CPC .............. *B60P 1/26* (2013.01); *B62D 33/037* (2013.01)

(58) Field of Classification Search
CPC .......... B60P 1/26; B60P 1/283; B62D 33/037; B62D 33/0273; B62D 33/03; B60J 5/108
USPC ..... 298/23 MD, 23 M, 23 S, 23 A; 296/57.1
See application file for complete search history.

(56) References Cited

U.S. PATENT DOCUMENTS

| | | |
|---|---|---|
| 2,683,545 A | 7/1951 | Wood |
| 3,322,464 A | 5/1967 | Merritt |
| 4,171,844 A | 10/1979 | Landaal et al. |
| 5,518,287 A | 5/1996 | Totani |
| 6,062,804 A | 5/2000 | Young et al. |
| 6,155,776 A | 12/2000 | Moyna |
| 6,719,349 B2 | 4/2004 | Moyna |
| 6,796,602 B2 | 9/2004 | Hagenbuch |
| 8,500,206 B2 * | 8/2013 | Rydstrom ............... B60P 1/006 298/23 MD |
| 2014/0091611 A1 * | 4/2014 | Petrick .................... B60P 1/165 298/22 R |

FOREIGN PATENT DOCUMENTS

WO    WO 2008/030155    8/2007

* cited by examiner

Primary Examiner — Stephen T Gordon
(74) Attorney, Agent, or Firm — Hunton Andrews Kurth LLP

(57) ABSTRACT

A rotatable tailgate assembly is provided for installation on a dump bed. The tailgate assembly has support members attachable to the side of the dump bed. Each support member has at least one bearing adjacent at a free end extending rearwardly of the dump bed's rear opening. A tailgate has a cylindrical tailgate shaft with a first end rotatably received within the bearing of a first support member and a second end rotatably received within a bearing of a second support member. The tailgate has a closure portion extending radially away from the tailgate shaft. The closure portion engages the rear edges of the dump bed floor and sides to close off the dump bed opening when the tailgate assembly is in a closed rotational position. The tailgate assembly also comprises a rotation actuator operatively connected to the tailgate shaft for selective rotation thereof.

9 Claims, 21 Drawing Sheets

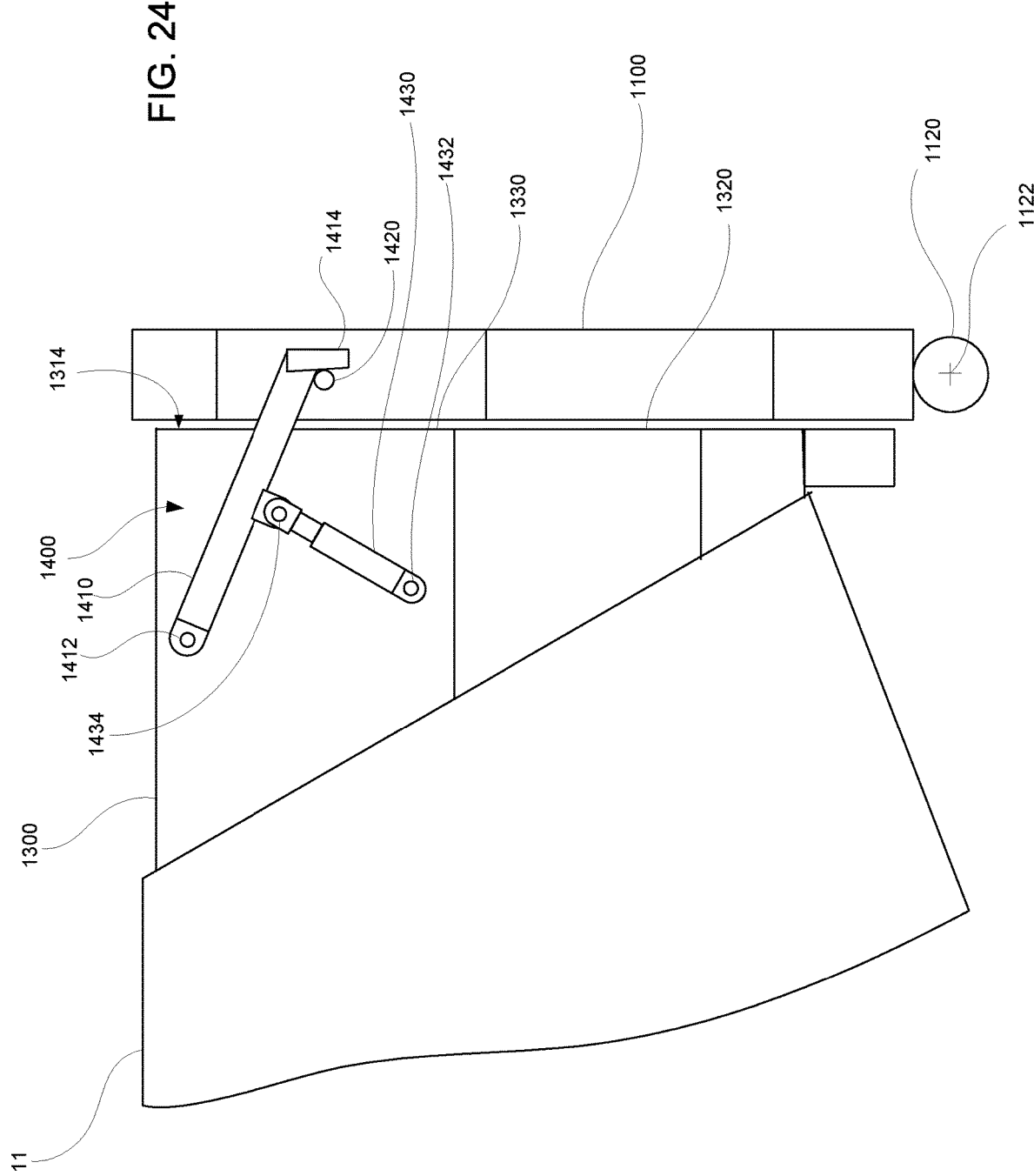

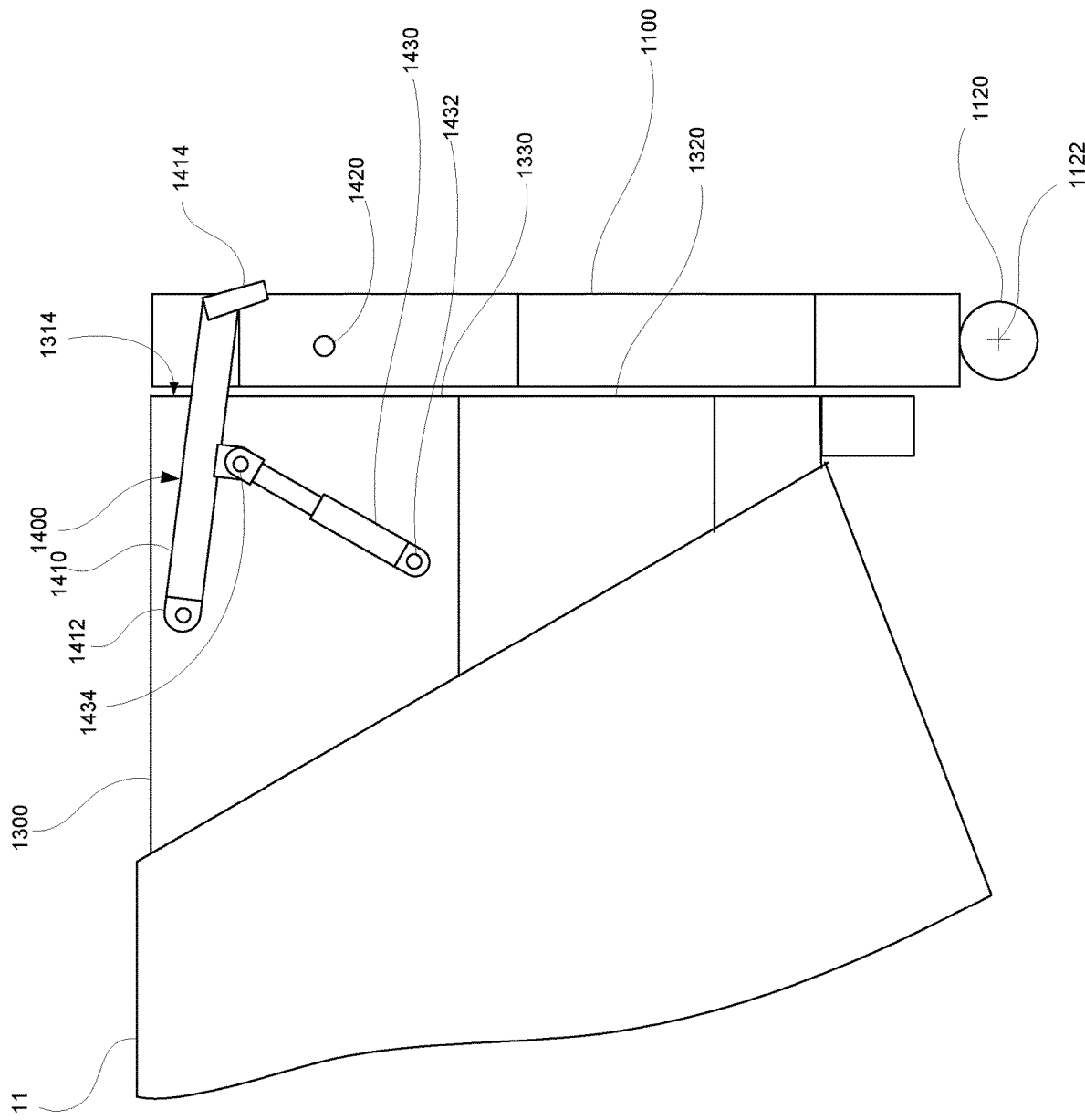

ROTATABLE TAILGATE

This application claims priority to U.S. Provisional No. 62/709,923, filed Feb. 5, 2018, the complete disclosure of which is incorporated herein by reference.

BACKGROUND OF THE INVENTION

The invention relates generally to work machines with open cargo load beds, and, more specifically, to a tailgate closure device that is selectively rotatable to close off an end of an open load bed.

Large off-road trucks used in construction and mining applications often do not have a gate or other closure at the rear of their dump beds. With reference to FIGS. 1 and 2, a typical off-road truck 10 has a dump bed 11 supported by axled wheel sets 16. The cargo area 12 of the dump bed 11 is bounded by a floor, a forward wall and side walls (which as shown in FIG. 2 may comprise an upper side wall 13 and a lower side wall 17), but has an open end at its tail end 14 to allow for the flow of material when the dump bed is rotated upward by hydraulic dump actuators 18. It can be seen that the open end at the tail tends to limit the load capacity of the dump bed 11. The usable dump bed volume can be increased to some extent by providing a closure (tailgate) which must be opened or removed when the truck goes to dump its load.

One approach to this has been to provide a closure having a mechanism that revolves the entire closure upward relative to the dump bed as described in U.S. Pat. No. 6,796,602. This approach, however, has proven to have reliability and maintainability issues.

The present invention provides a rotary tailgate that rotates downward and can be parked underneath the dump bed. The tailgate can be used in combination with a bed extension module that matches the contours of the tail end of the dump bed and serves to further increase its usable volume. The extension module is generally configured to match the interior contours of the truck dump bed for insertion into and permanent or semi-permanent connection thereto.

SUMMARY OF THE INVENTION

An illustrative aspect of the invention provides a rotatable tailgate assembly for installation on a dump bed having a floor and first and second sides with rear edges collectively defining a rear dump bed opening. The tailgate assembly comprises first and second support members, each having an attachment end attachable to a respective side of the dump bed when the tailgate assembly is in an installed condition. Each support member also has a free end extending rearwardly past the dump bed opening when the tailgate assembly is in the installed condition. Each support member has at least one bearing attached to the support member adjacent its free end. The tailgate assembly further comprises a tailgate. The tailgate comprises a cylindrical tailgate shaft having a first end rotatably received within the at least one bearing of the first support member, a second end rotatably received within the at least one bearing of the second support member, and a lengthwise shaft axis extending through the first and second shaft ends. The tailgate further comprises a closure portion attached to and extending radially away from the tailgate shaft. The closure portion is configured for engaging the rear edges of the dump bed floor and sides to close off the dump bed opening when the tailgate assembly is in the installed condition and the tailgate is in a closed rotational position. The tailgate assembly also comprises a rotation actuator mounted to a first one of the first and second support members. The rotation actuator is operatively connected to the tailgate shaft for selective rotation thereof.

Another aspect of the invention provides a dump bed extension module for installation on a dump bed having a floor and first and second sides with rear edges collectively defining a rear dump bed opening. The dump bed extension module comprises a dump bed extension comprising a floor plate and first and second side panels. The floor plate and side panels are attachable to inner surfaces of the dump bed floor and sides so that they each extend rearwardly from the rear dump bed opening. The floor plate and first and second side panels have rear plate and panel edges collectively defining an extended dump bed opening. The dump bed extension further comprises an adaptor plate attached to the floor plate at the extended dump bed opening and extending downward therefrom. A plurality of shaft support bearings are attached to the adaptor plate. The shaft bearings are in registration along a bearing axis. The dump bed extension module further comprises a tailgate. The tailgate comprises a cylindrical tailgate shaft having first and second ends and a lengthwise shaft axis. The tailgate also comprises a closure portion attached to and extending radially away from the tailgate shaft. The closure portion is configured for engaging the rear plate and panel edges of the dump bed extension to close off the extended dump bed opening when the tailgate is in a closed rotational position. The tailgate is mounted to the dump bed extension with the tailgate shaft rotatably received within the shaft support bearings so that the shaft axis is collinear with the bearing axis and so that the tailgate is rotatable between the closed rotational position and an open rotational position in which the tailgate closure is rotationally spaced apart from the extended dump bed opening. The dump bed extension module also comprises a tailgate rotation assembly. The rotation assembly comprises at least one support member attachable to a side of the dump bed. Each of the at least one support member has a free end extending rearwardly past the extended dump bed opening. the rotation assembly also comprises at least one rotation actuator mounted to a respective one of the at least one support member and operatively connected to the tailgate shaft for selective rotation thereof.

BRIEF DESCRIPTION OF THE DRAWINGS

FIG. 24 is a side view of tailgate locking mechanism usable in conjunction with embodiments of the invention, the locking mechanism being in a locked configuration; and FIG. 25 is a side view of tailgate locking mechanism usable in conjunction with embodiments of the invention, the locking mechanism being in an unlocked configuration

DETAILED DESCRIPTION OF THE INVENTION

Figure 1:
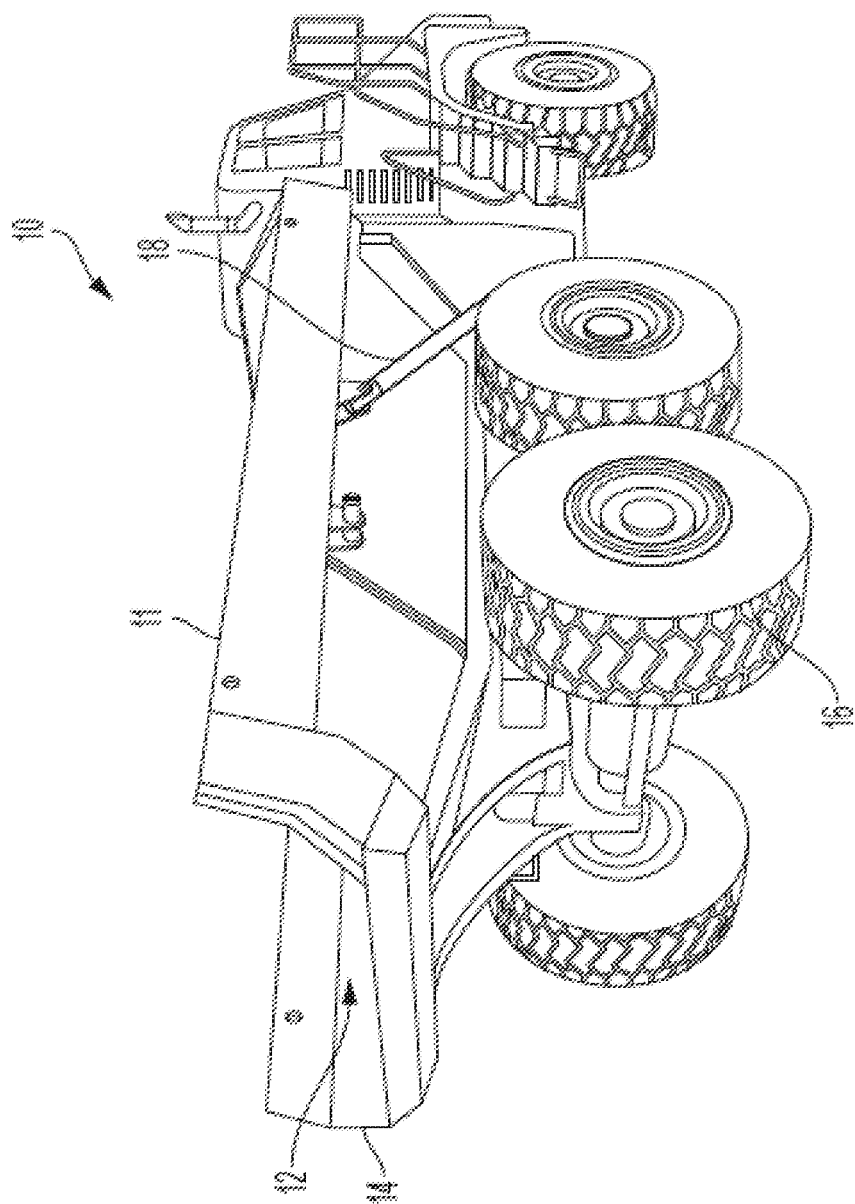
FIG. 1 is an illustration of a typical off-road dump vehicle.
Figure 2:
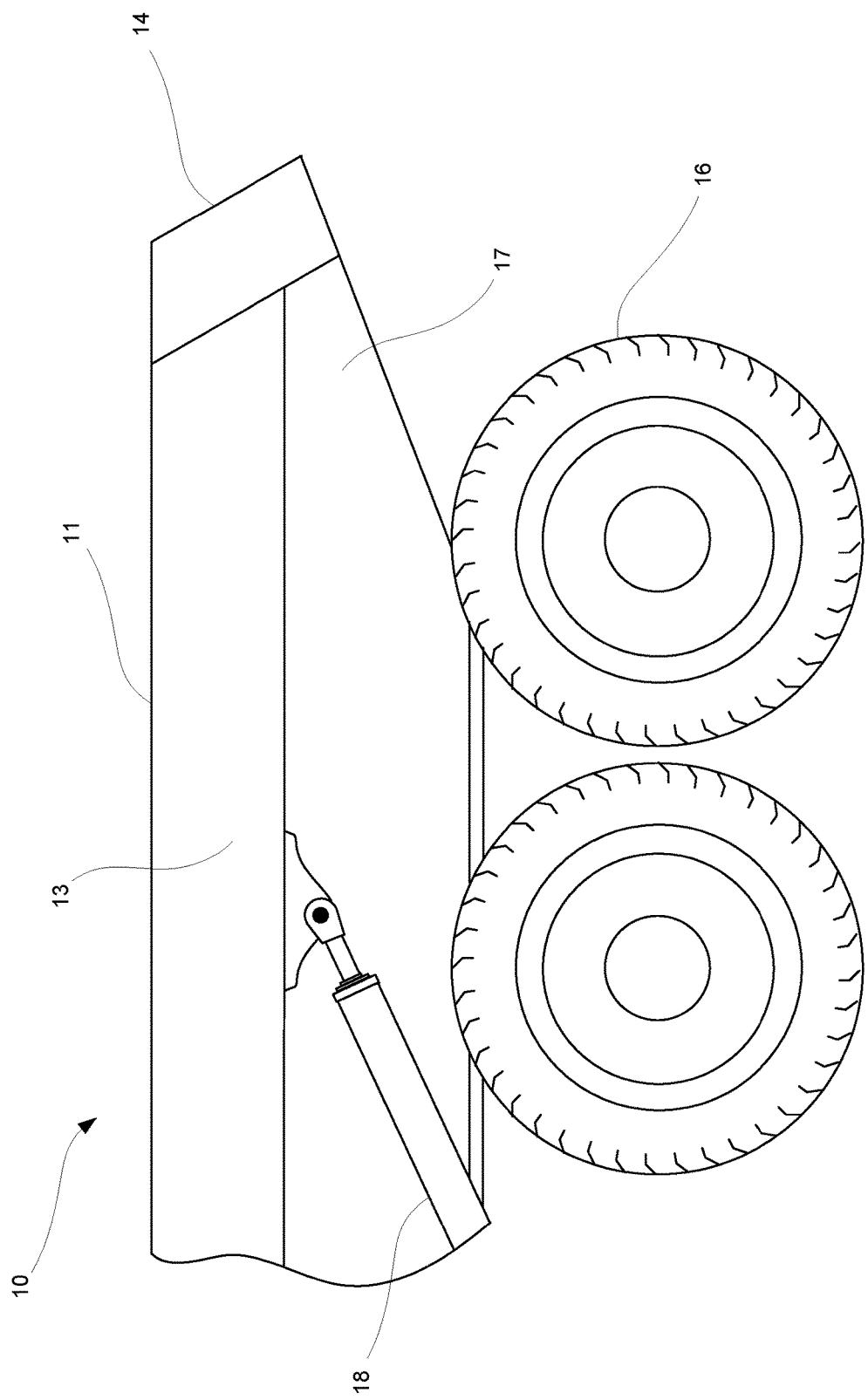
FIG. 2 is a schematic representation of a dump bed portion of a typical off-road dump vehicle.
Figure 3:
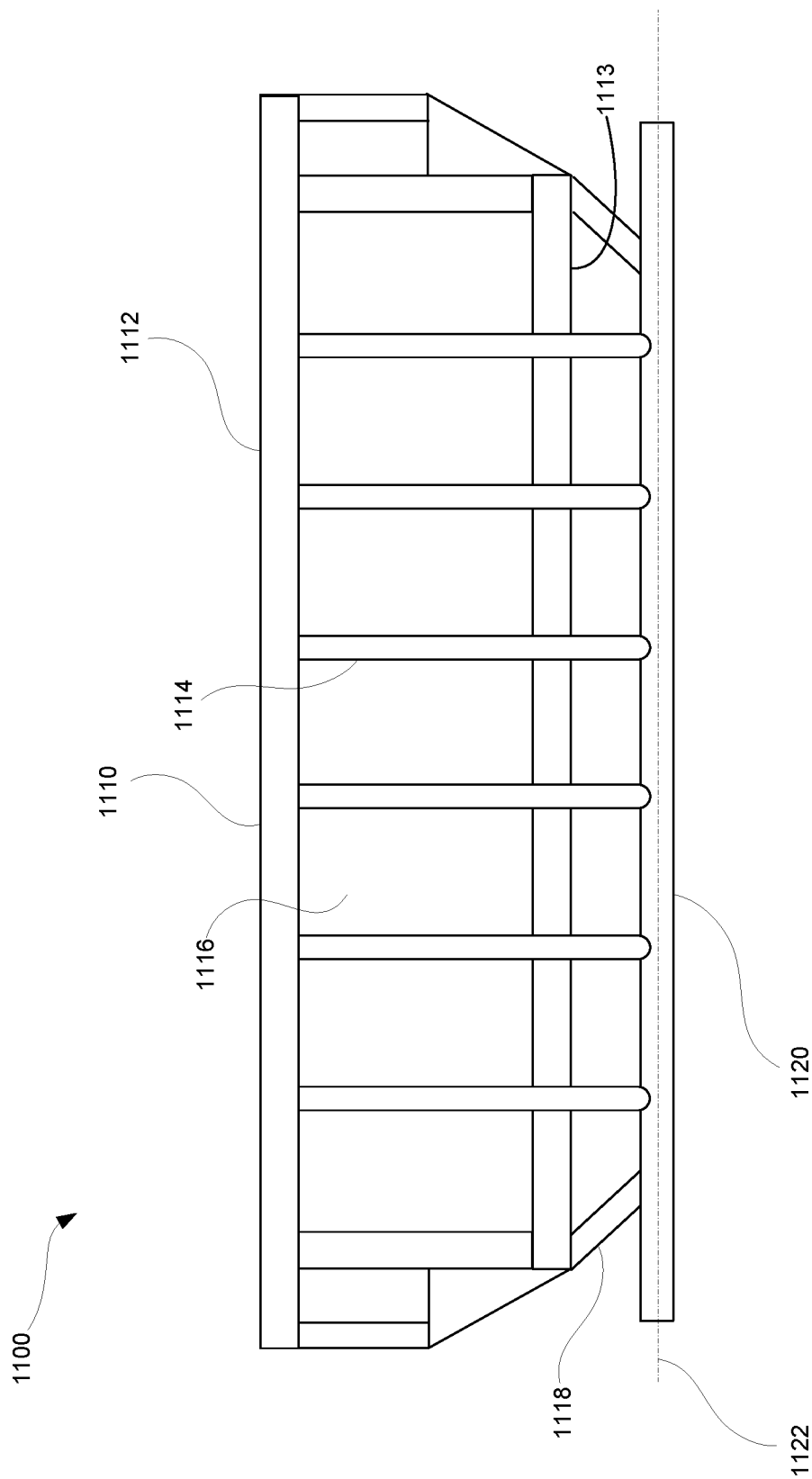
FIG. 3 is a rear view of a tailgate structure according to an embodiment of the invention.

The present invention advantageously provides a tailgate that provides a secure closure for the rear opening of a truck's dump bed, but is also rotatable about an axis below the opening so that it can be rotated to a stowed (or "parked") position underneath the dump bed. FIG. 3 illustrates a tailgate 1100 according to an exemplary embodiment of the invention. The tailgate 1100 has a closure portion 1110 configured to engage the body of the dump bed 11 and close off its rear opening 14. The closure portion 1110 comprises steel plate 1116 reinforced by upper and lower cross members 1112, 1113 and side members 1118 and a plurality of vertical uprights 1114. In an illustrative embodiment, the upper and lower cross members 1112, 1113 and side members 1118 may be formed from four inch square tubing. In a typical off-road vehicle application, the tailgate 1100 is twenty three feet wide. The uprights 1114, which may be made of two by four inch rectangular tubing, extend below the lower cross member 1113 to a tailgate shaft 1120. In a typical embodiment, the tailgate shaft 1120 may be a four inch steel cold roll shaft to which the ends of the uprights are welded.

Figure 4:
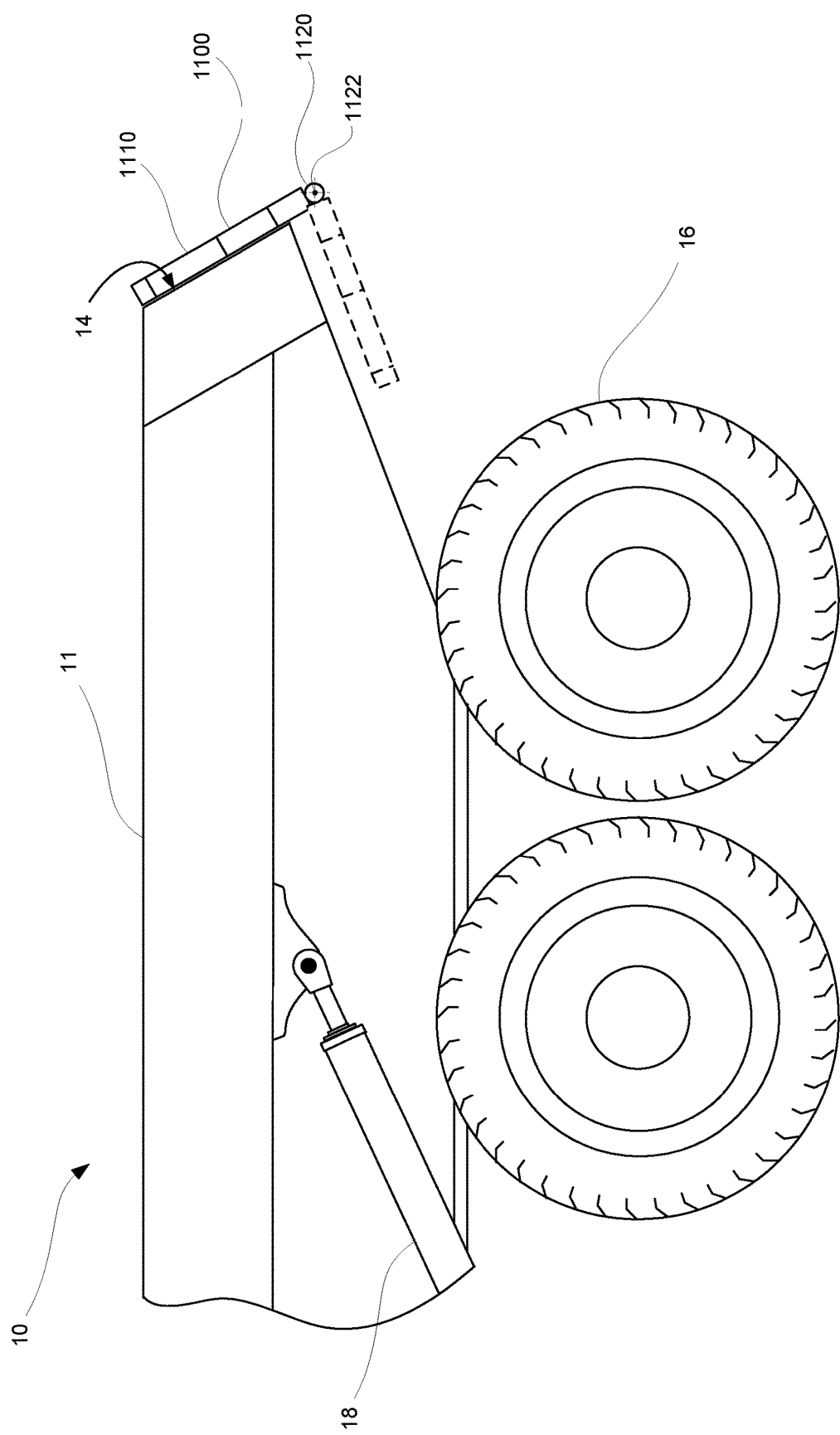
FIG. 4 is a side view of a rotatable tailgate according to an embodiment of the invention installed on the dump bed of an off-road dump vehicle.

As shown in FIG. 4, the tailgate 1100 is configured to be mounted to the dump bed 11 with the shaft axis 1122 below and aft of the rear opening 14 so that the tailgate 1100 can be rotated around the shaft axis 1122 from a closed position to an open position in which the tailgate 1100 is stowed beneath the dump bed 11. It can be seen that this may require a rotation through an angle that is greater than 180 and potentially greater than 270 degrees. As a result, conventional hydraulic actuator and linkage arrangements cannot be used to rotate the tailgate 1100 from the closed position to the parked position.

Figure 5:
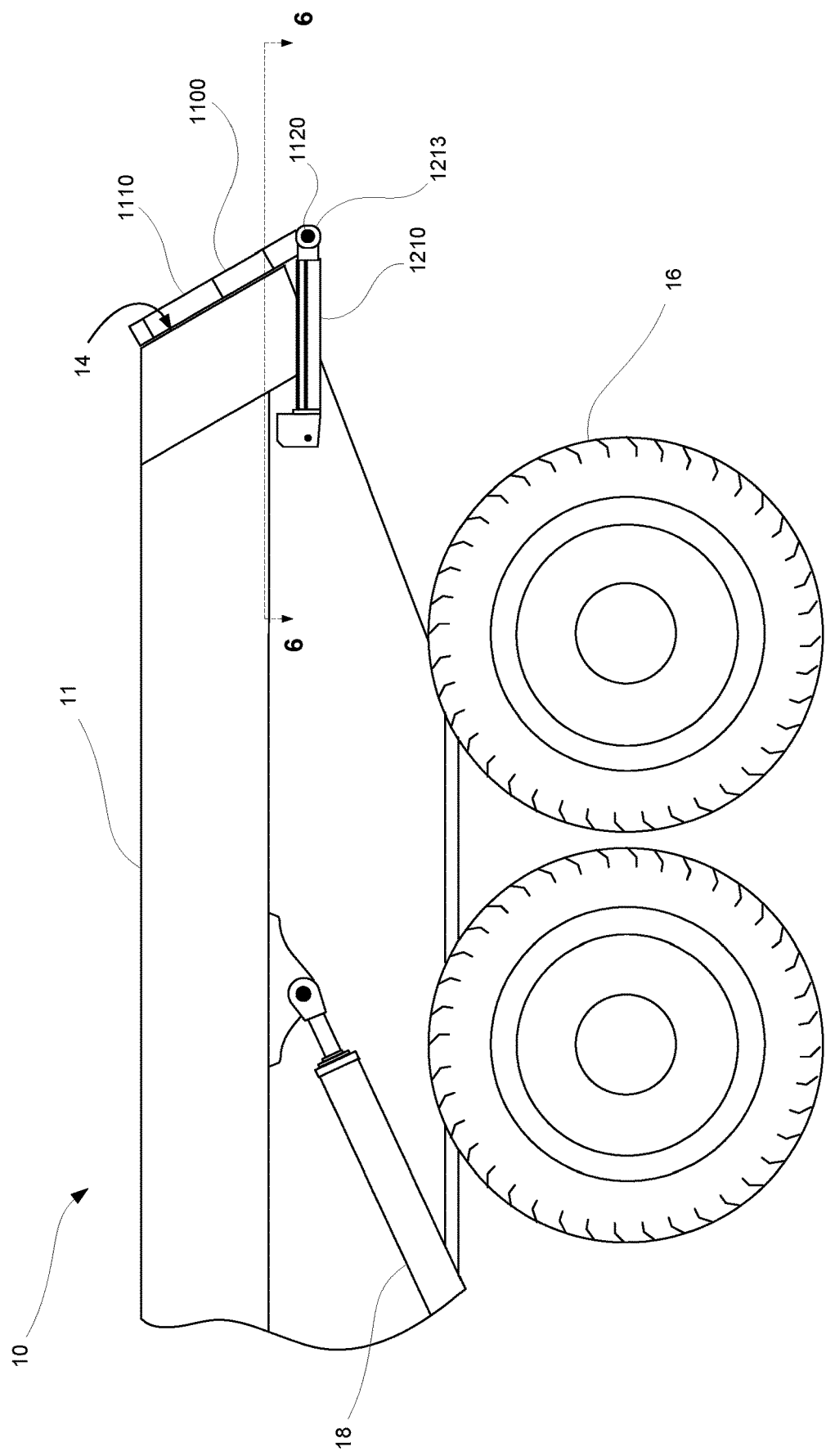
FIG. 5 is a side view of an installed rotatable tailgate according to an embodiment of the invention wherein the tailgate is in a closed position.
Figure 6:
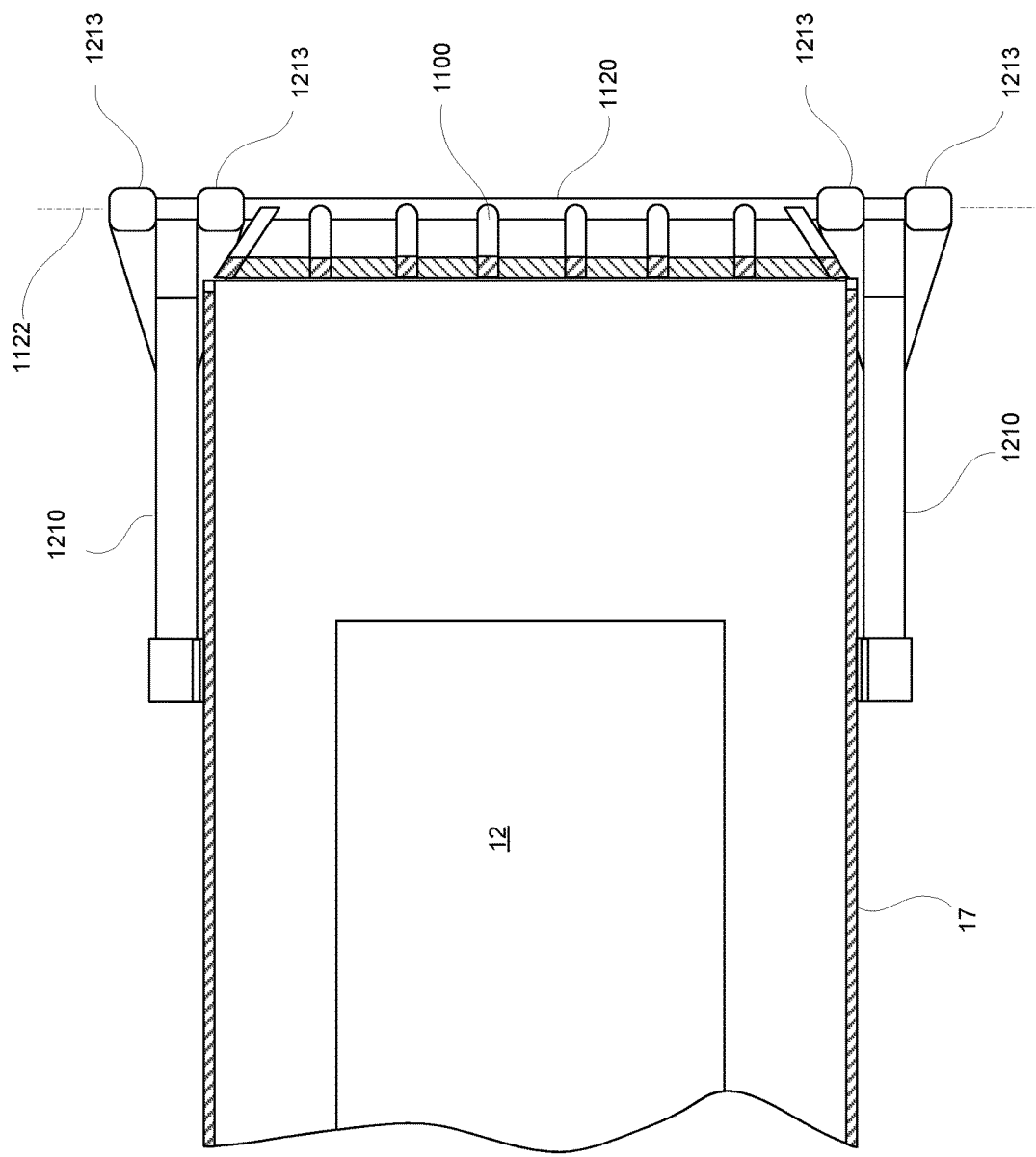
FIG. 6 is a top section view of an installed rotatable tailgate assembly according to an embodiment of the invention wherein the tailgate is in a closed position.

As shown in FIGS. 5 and 6, the tailgate 1100 may be mounted to the dump bed 11 by a pair of main support members 1210. The main support members 1210 may be welded or bolted to the dump bed 11 so that they extend rearward therefrom. Additional bracing members or weld points can be added to further support the support members 1210, if necessary. At the rearward end of each support member 1210 are mounted a pair of pillow block bearings 1213 configured to slidably and rotatably receive the tailgate shaft 1120. As shown in FIG. 6, the support members 1210 are structured to position and support the tailgate 1100 on both sides of the dump bed 11 so that it can be rotated between the closure and parked positions shown in FIG. 4.

The present invention provides a rotatable tailgate assembly that combines the tailgate 1100 and support structure with a tailgate rotation actuator mounted to the support member 1210. The tailgate rotation actuator could be any motorized or mechanical device adapted to controllably rotate the tailgate 1100 by turning the shaft 1120.

Figure 7:
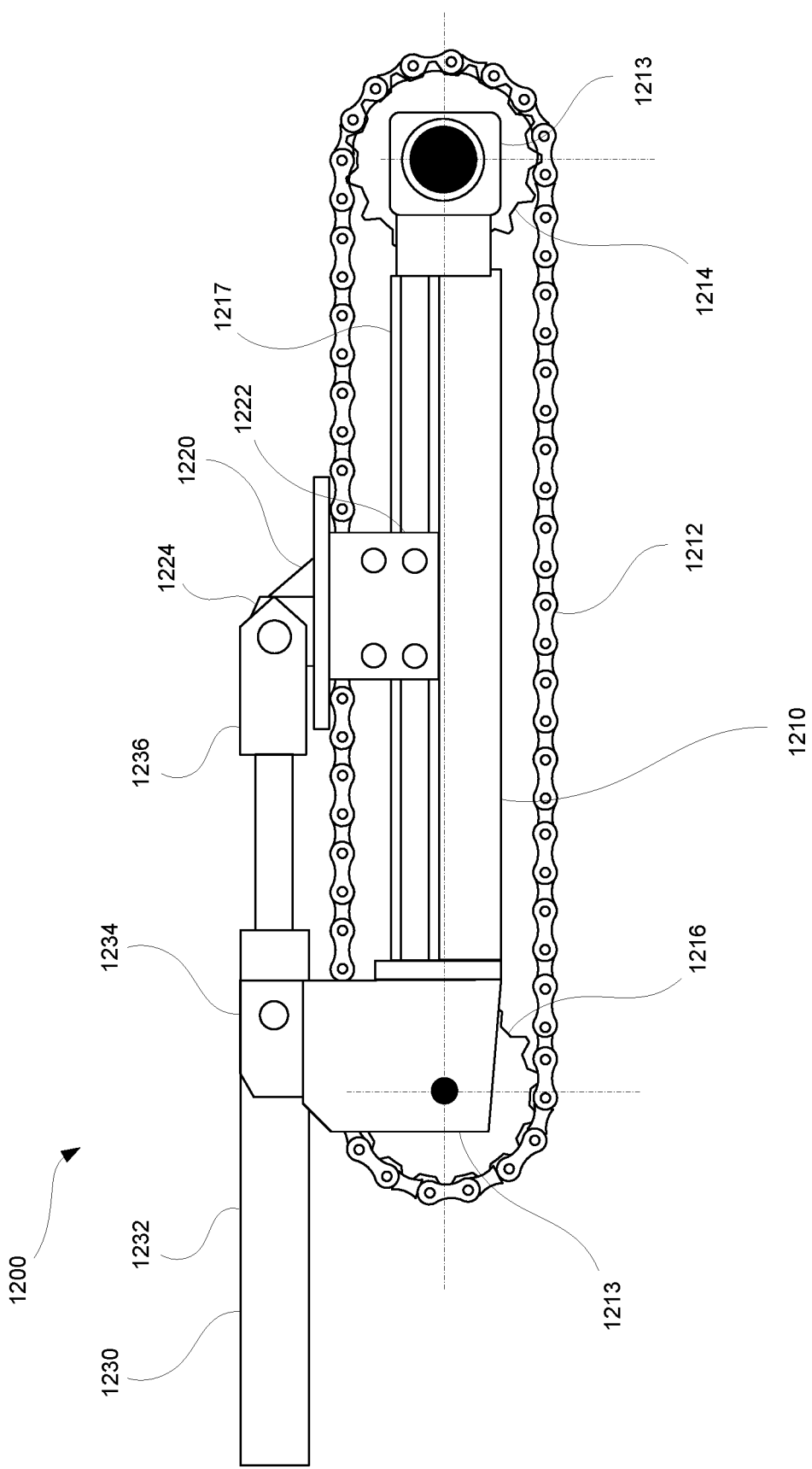
FIG. 7 is a side view of a rotation actuator for a rotatable tailgate assembly according to an embodiment of the invention.

In certain embodiments of the present invention, a rotation actuator may be provided that converts linear actuator motion to rotational motion of the tailgate through angles greater than 180 degrees. FIG. 7 illustrates a rotation actuator 1200 that is mountable to one or both of the support members 1210. The rotation actuator 1200 comprises an actuator carriage 1220 and carriage guide 1217, a drive chain 1212, drive sprocket 1214, idler 1216, and a linear actuator 1230. In this embodiment, the drive sprocket 1214 is positioned between the pillow block bearings 1213 supporting the tailgate shaft 1120 and is fixedly attached to the tailgate shaft 1120 for rotation therewith. An idler support block 1213 supporting an idler 1216 is attached to the forward end of the support member 1210 in alignment with the drive sprocket 1214. The drive chain 1212 is mounted to the drive sprocket 1214 and the idler 1216 so as to operably engage the drive sprocket 1214 so that movement of the chain 1212 results in rotation of the drive sprocket 1214 and the tailgate shaft 1120. In some embodiments, the horizontal position of the idler support block 1213 may be adjustable to maintain tension on the chain 1212. In particular embodiments tension may be maintained through by using shims to establish and maintain the position of the idler support block 1213.

Figure 9:
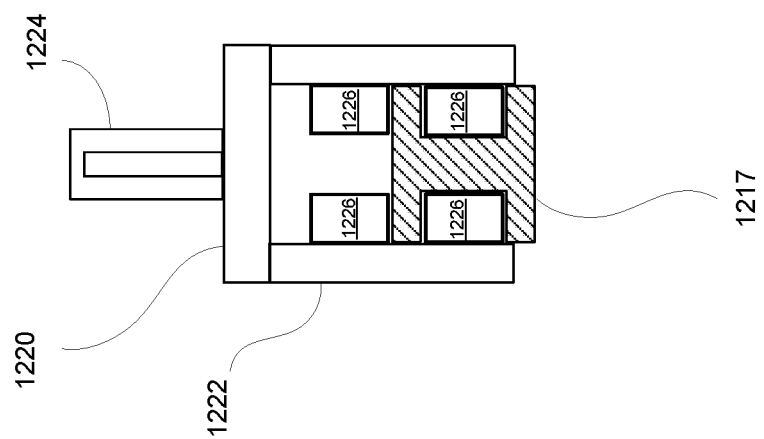
FIG. 9 is a section view of the chain drive carriage and carriage guide of FIG. 8.
Figure 8:
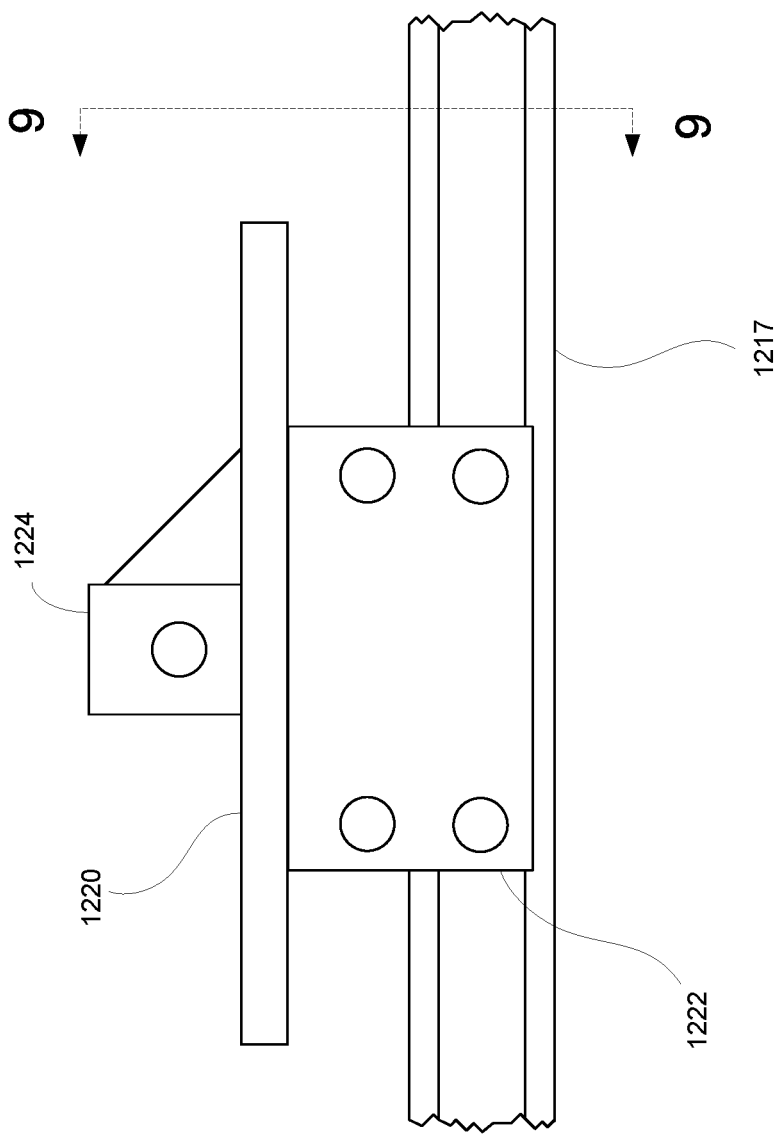
FIG. 8 is a side view of a chain drive carriage and a portion of a carriage guide of a rotation actuator for a rotatable tailgate assembly according to an embodiment of the invention.

The actuator carriage 1220 is configured to slide along a carriage guide 1217 that is part of or is attached to the upper side of the support member 1210. As shown in FIGS. 8 and 9, the carriage guide 1217 may be formed with an I-shaped cross section and the carriage 1220 provided with rollers 1226. The rollers 1226 may be configured to engage the top and underside of the upper portion of the I-shaped carriage guide member to constrain the motion of the carriage 1220 to linear motion along the length of the guide 1217. In an illustrative embodiment, the carriage 1220 is fabricated of one inch steel with eight rollers, each roller having a static load capacity of 22,000 lbs.

The drive chain 1212 is attached to the carriage 1220 so that as the carriage 1220 moves in a linear path in a direction C toward the rear of the support member 1210, the chain 1212 moves in a clockwise direction. This, in turn, causes clockwise rotation R of the tailgate shaft 1120 about the shaft axis 1122. Conversely, linear motion of the actuator carriage 1220 toward the front end of the actuator main body 1210 causes the drive chain 1212, sprocket 1214 and tailgate shaft 1120 to rotate in the counter-clockwise direction. It will be understood that the carriage arrangement selected and the chain/sprocket combination sized so as to provide a desired rotation range for a given length of carriage travel.

Linear motion of the carriage 1220 is selectively provided by the linear actuator 1230. The linear actuator 1230 has a fixed portion 1232 attached to the forward end of the support member 1210 and an extension end 1236 attached to a flange 1224 on the carriage 1220. In the illustrated embodiment, the fixed portion 1232 is attached to the idler support 1213 by a trunnion mount 1234. In this configuration, extension of the extension end 1236 in the rearward direction causes rearward movement of the actuator carriage 1220 and clockwise rotation of the tailgate shaft 1120. The actuator 1230 may be sized to provide the carriage travel range necessary to rotate the tailgate 1100 through the desired rotational range.

It will be understood that the directions and rotations described above are for a rotation actuator 1200 to be applied to the left side of a dump bed. For a right side rotation actuator 1200, the rotational directions will be reversed.

The linear actuator 1230 may be a hydraulic actuator configured for connection to the existing hydraulic system of a truck. In a particular embodiment, the actuator may be tied into the hoist and brake cooling system of the truck. in such an embodiment, the oil used for tailgate rotation may be filtered before it is returned to the hydraulic tank. This oil would not be circulated through the brake disk or any component or valve. In an illustrative embodiment, two hydraulic cylinders with a five inch bore and a forty five inch stroke and provide 41,234 pounds of force per cylinder using 2,500 psi of hydraulic pressure.

The above-described embodiment provides a rotation actuator that uses linear actuator motion (e.g., by a hydraulic actuator) to rotate the drive chain. It will be understood that other mechanisms such as a rotational drive motor could be used.

Figure 11:
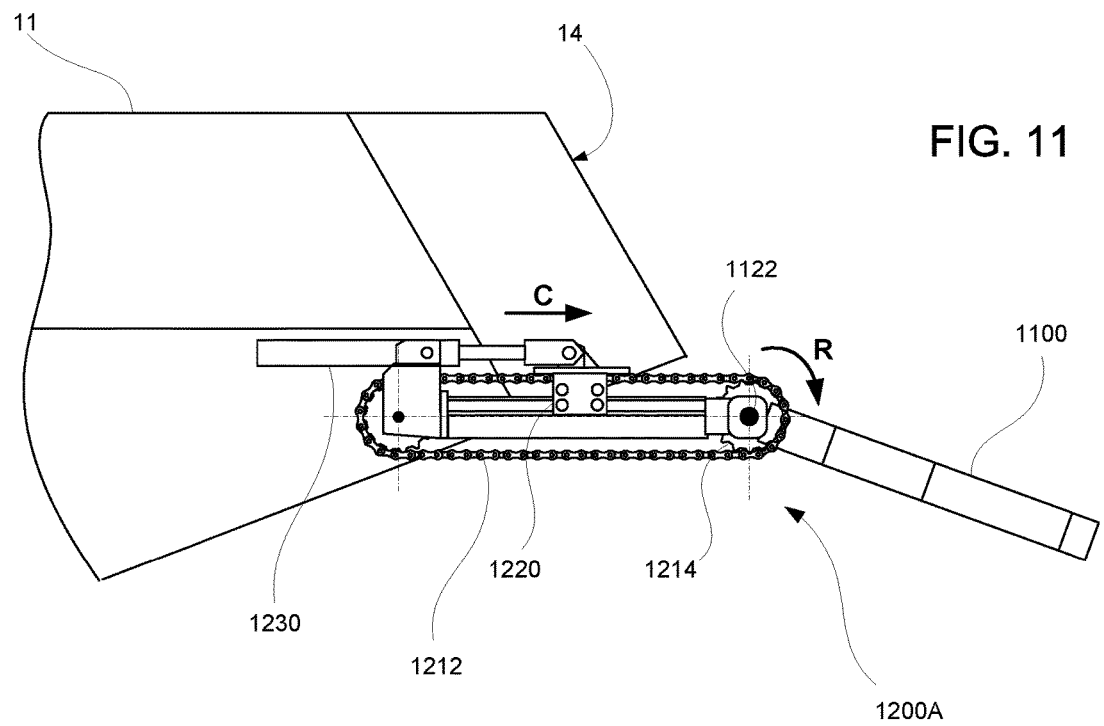
FIG. 11 is a side view of an installed rotatable tailgate assembly according to an embodiment of the invention wherein the tailgate is in an open position.
Figure 12:
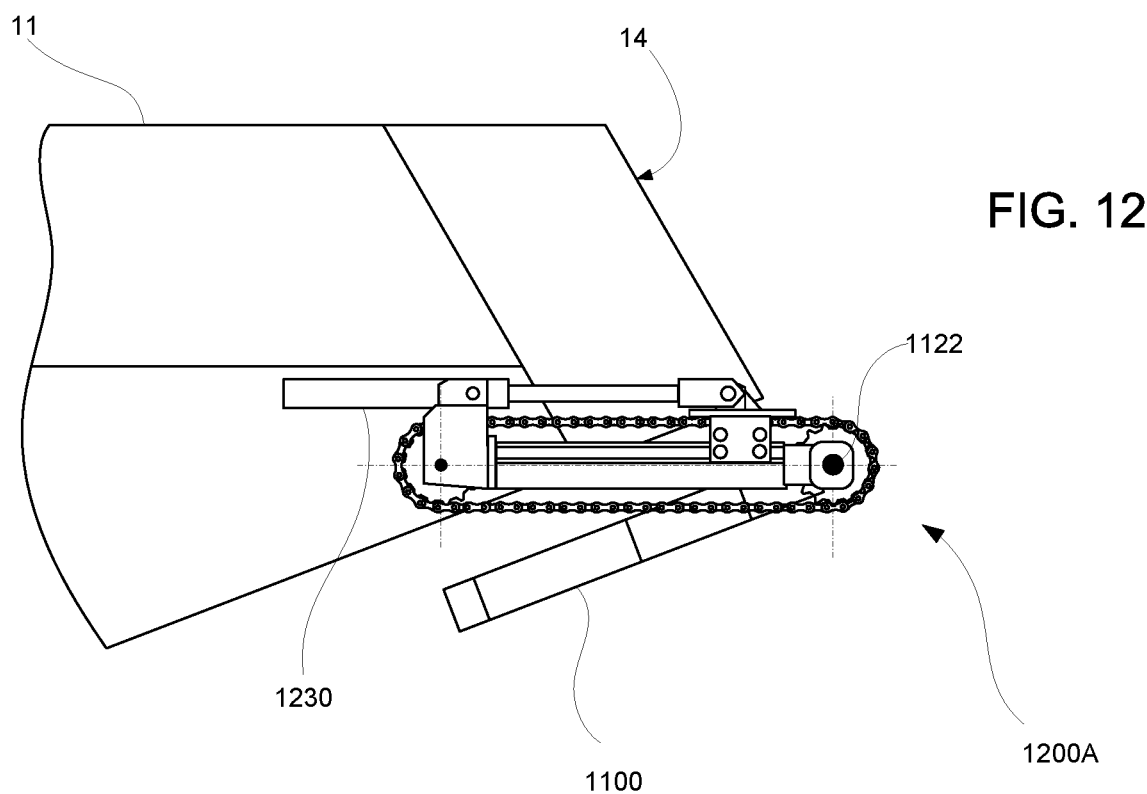
FIG. 12 is a side view of an installed rotatable tailgate assembly according to an embodiment of the invention wherein the tailgate is in a stowed position.
Figure 13:
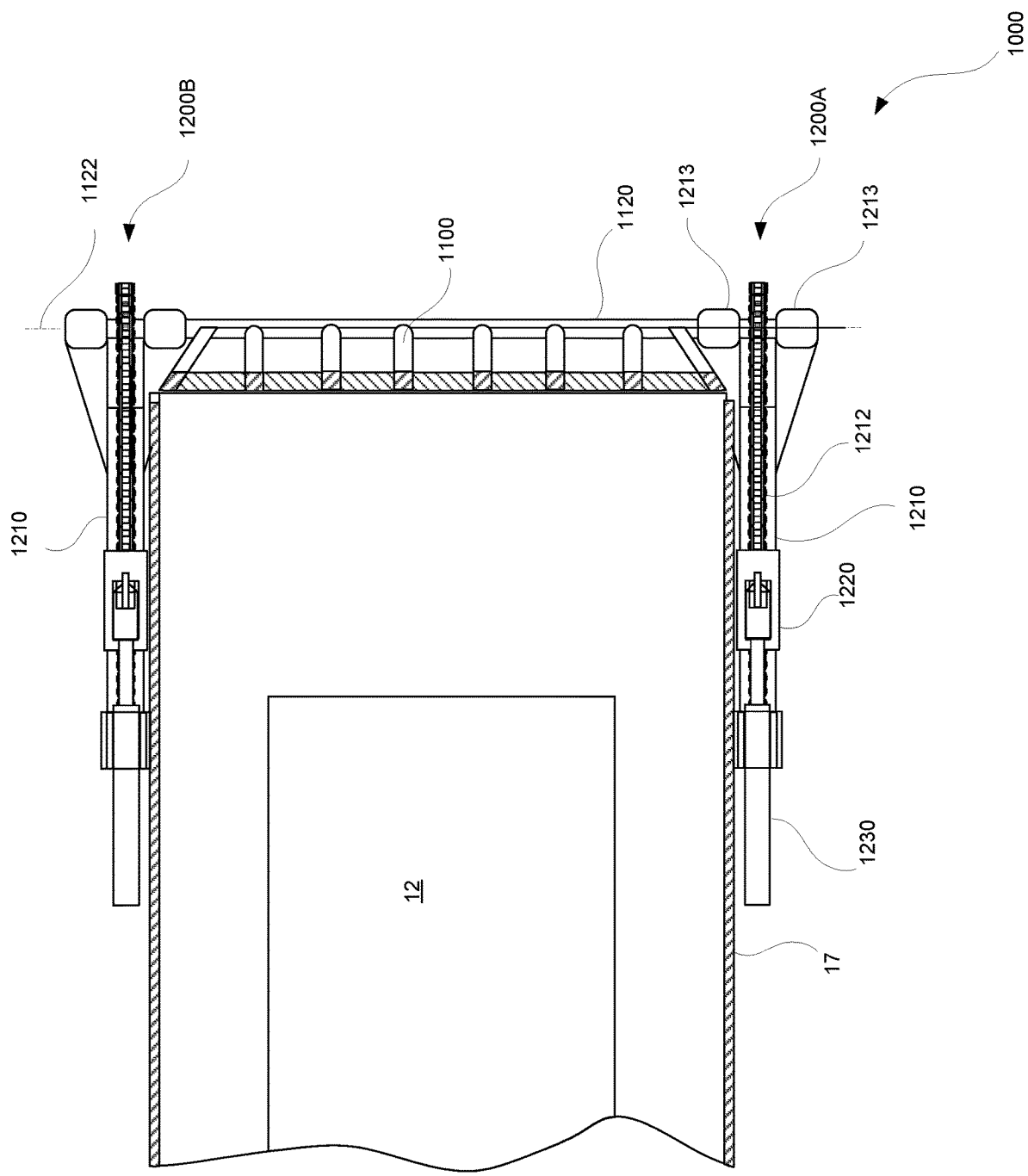
FIG. 13 is a top section view of an installed rotatable tailgate assembly according to an embodiment of the invention wherein the tailgate is in a closed position.
Figure 14:
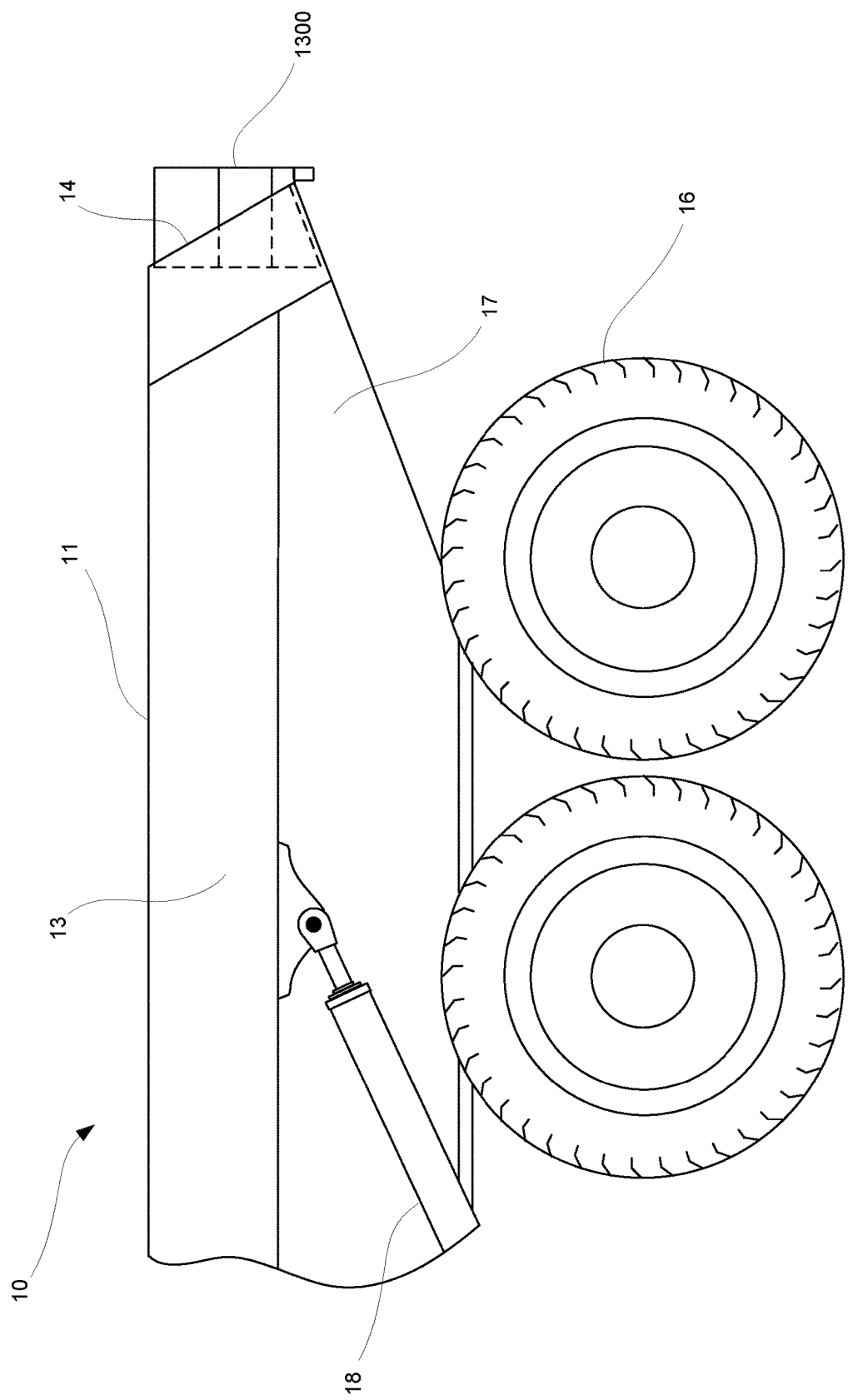
FIG. 14 is a side view of an installed dump bed extension according to an embodiment of the invention.
Figure 15:
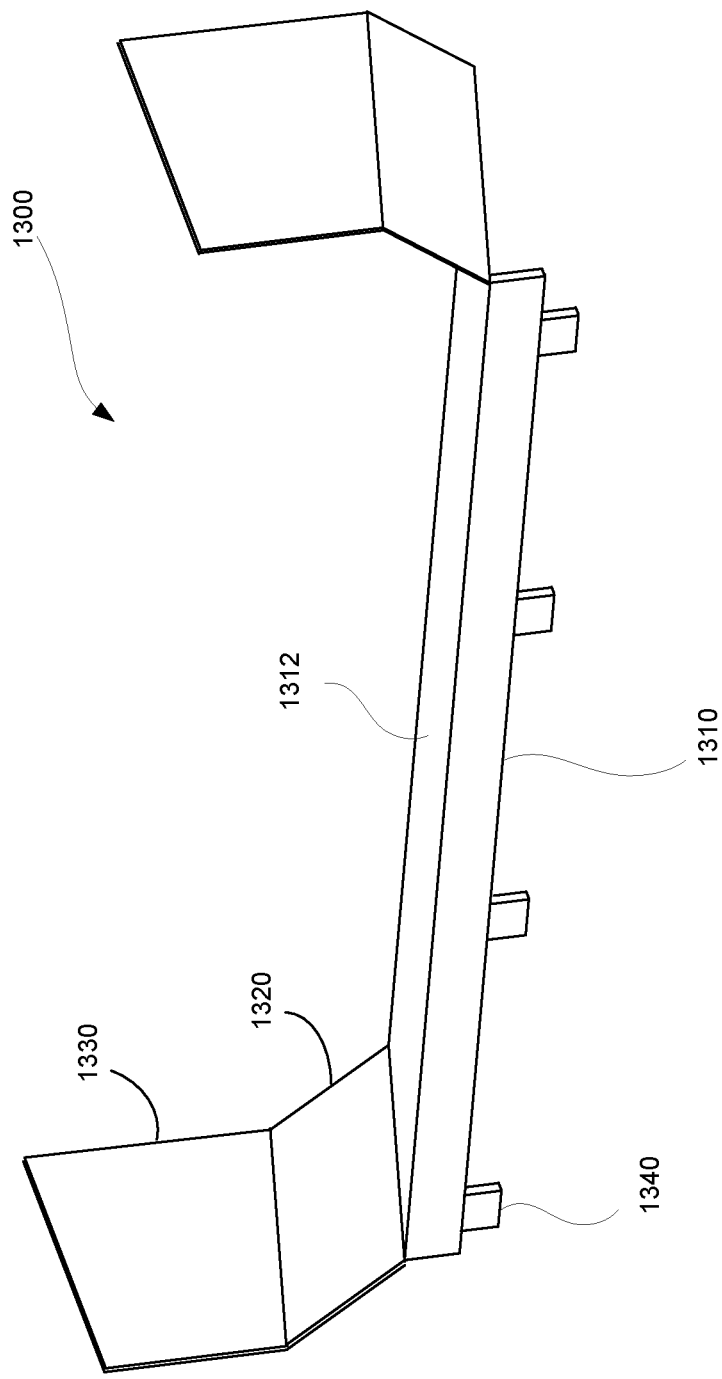
FIG. 15 is a perspective view of dump bed extension according to an embodiment of the invention.
Figures 16, 17:
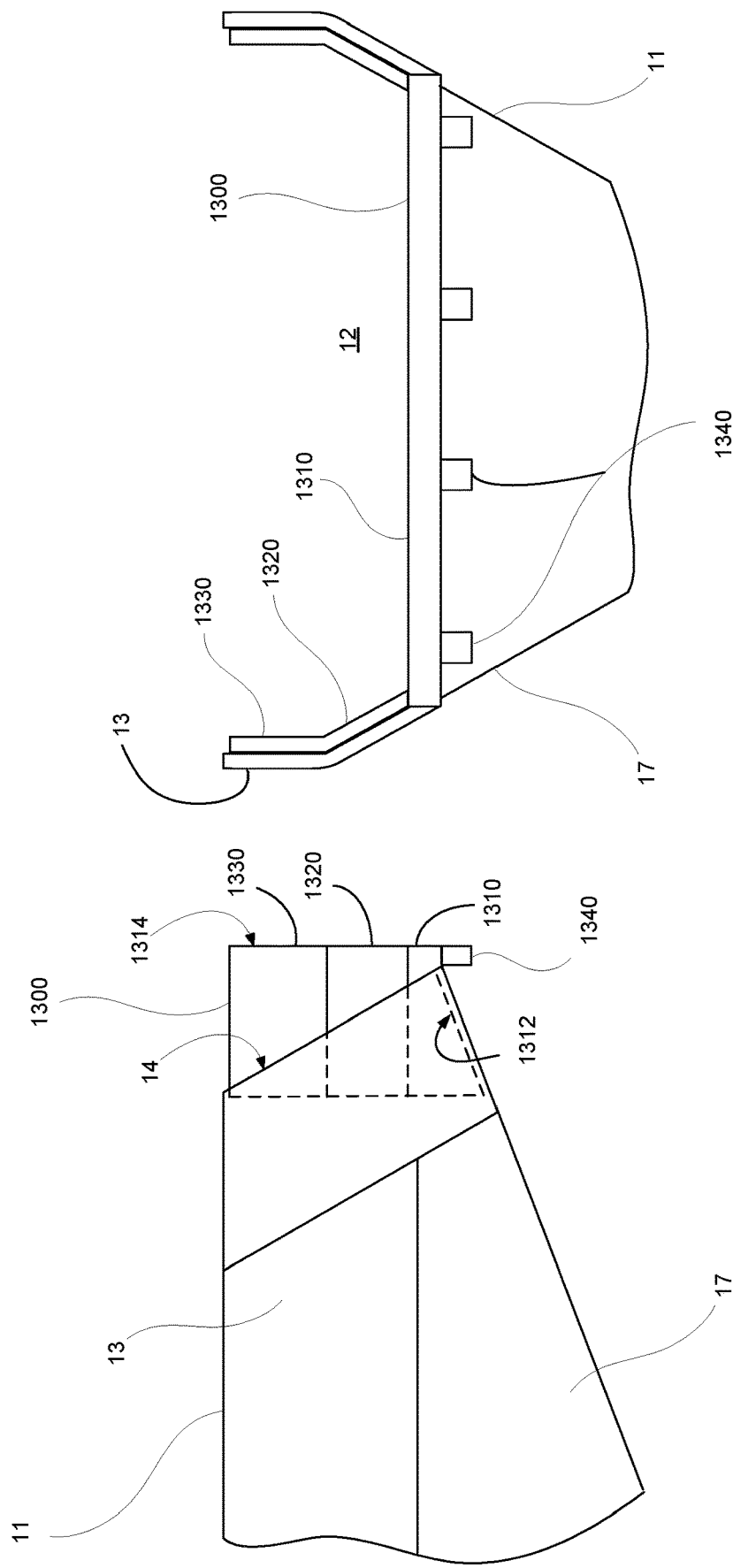
FIG. 16 is a side view of an installed dump bed extension according to an embodiment of the invention.
FIG. 17 is a rear view of an installed dump bed extension according to an embodiment of the invention.

FIGS. 10-13 illustrate a rotatable tailgate assembly 1000 that combines the tailgate 1100 and rotation actuator 1200. As shown in FIGS. 10-13, the rotatable tailgate assembly 1000 is mountable to the dump bed 11 of a truck by bolting or welding the support members 1210 to the dump bed 11. In preferred embodiments of the invention, two rotation actuators 1200 are used as shown in FIG. 13, one on the left side (1200A) of the dump bed 11 and one on the right side (1200B). In some cases, only one may be necessary. In either case, the tailgate 1100 is installed with one end of the tailgate shaft 1120 supported by the left support member 1210 and the other end of the tailgate shaft supported by the right support member 1210.

Figure 10:
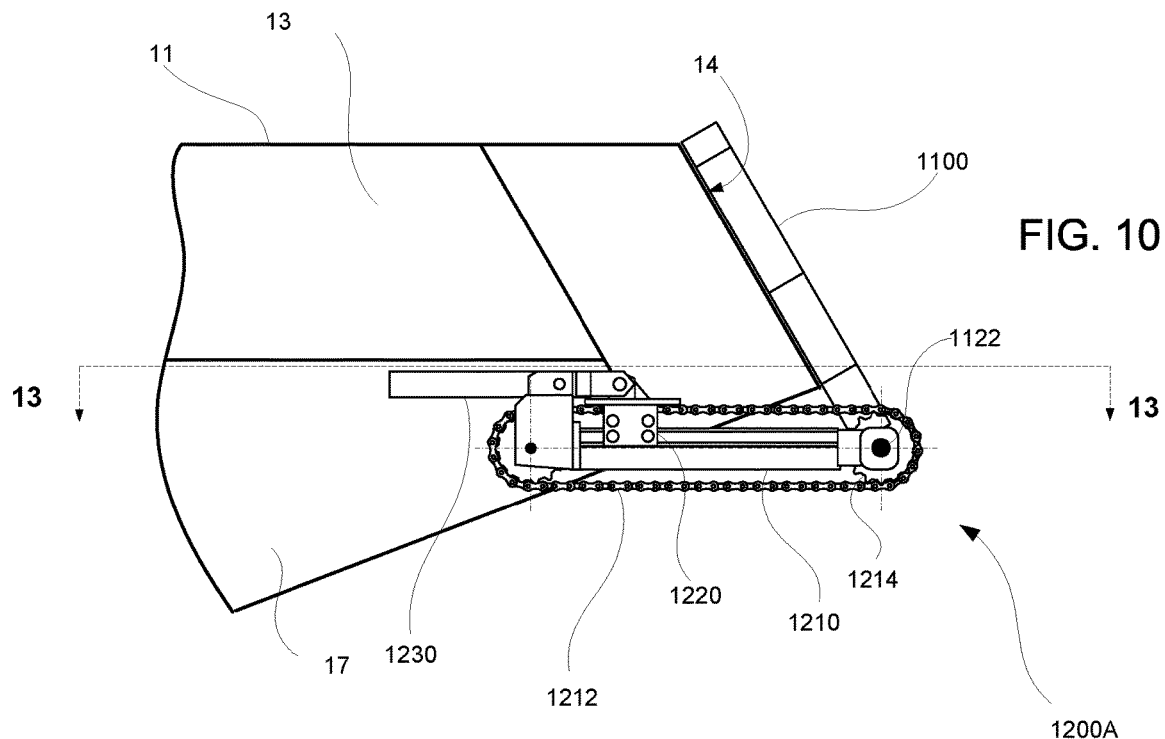
FIG. 10 is a side view of an installed rotatable tailgate assembly according to an embodiment of the invention wherein the tailgate is in a closed position.

FIG. 10 illustrates the left side rotation actuator 1200A with the tailgate 1100 in a closed position in which it closes off the rear dump bed opening 14. While the operation of this embodiment is described with respect to the left actuator 1200A, it will be understood that rotation of the tailgate 1100 is accomplished by simultaneous operation of the right side actuator 1200B. In the illustrated configuration, the linear actuator 1230 is in a retracted condition and the carriage 1220 is at its forward-most location. In FIG. 11, the linear actuator 1230 has been partially extended, causing the carriage 1220 to move rearward, thereby causing the drive chain 1212, sprocket 1214 and tailgate 1100 to rotate around the shaft axis 1122. In FIG. 12, the linear actuator 1230 is fully extended and the carriage 1220 is at its rearward-most location. In this configuration, the tailgate 1100 has been rotated all the way around to a stowed position underneath the dump bed 11. Subsequent retraction of the linear actuator 1230 reverses the above-described motions and causes the tailgate 1100 to rotate back toward the closed configuration.

As noted above, the linear actuator 1230 may be a hydraulic actuator connected or connectable to the existing hydraulic system of the truck 10. Controls for the actuation of the system may be placed in the cab of the truck 10. In a particular embodiment, the electrical system that controls the system includes two rocker switches, one for a tail gate lock (to be described below) and one for rotation of the tailgate 1100. Interconnection with the controls of the dump bed 11 can be used to assure the bed 11 will not dump if the tailgate 1100 is in the closed position. Further, the system may be configured so that the tailgate 1100 cannot be rotated unless the bed 11 is in its haul (i.e., lowered) position. Indicator lights may be used to alert the operator to the configuration of the lock and/or to show the position of the tailgate 1100. The electrical system may also be used to protect the hydraulic cylinders from being over-pressured by using limit switches for the travel.

Figure 18:
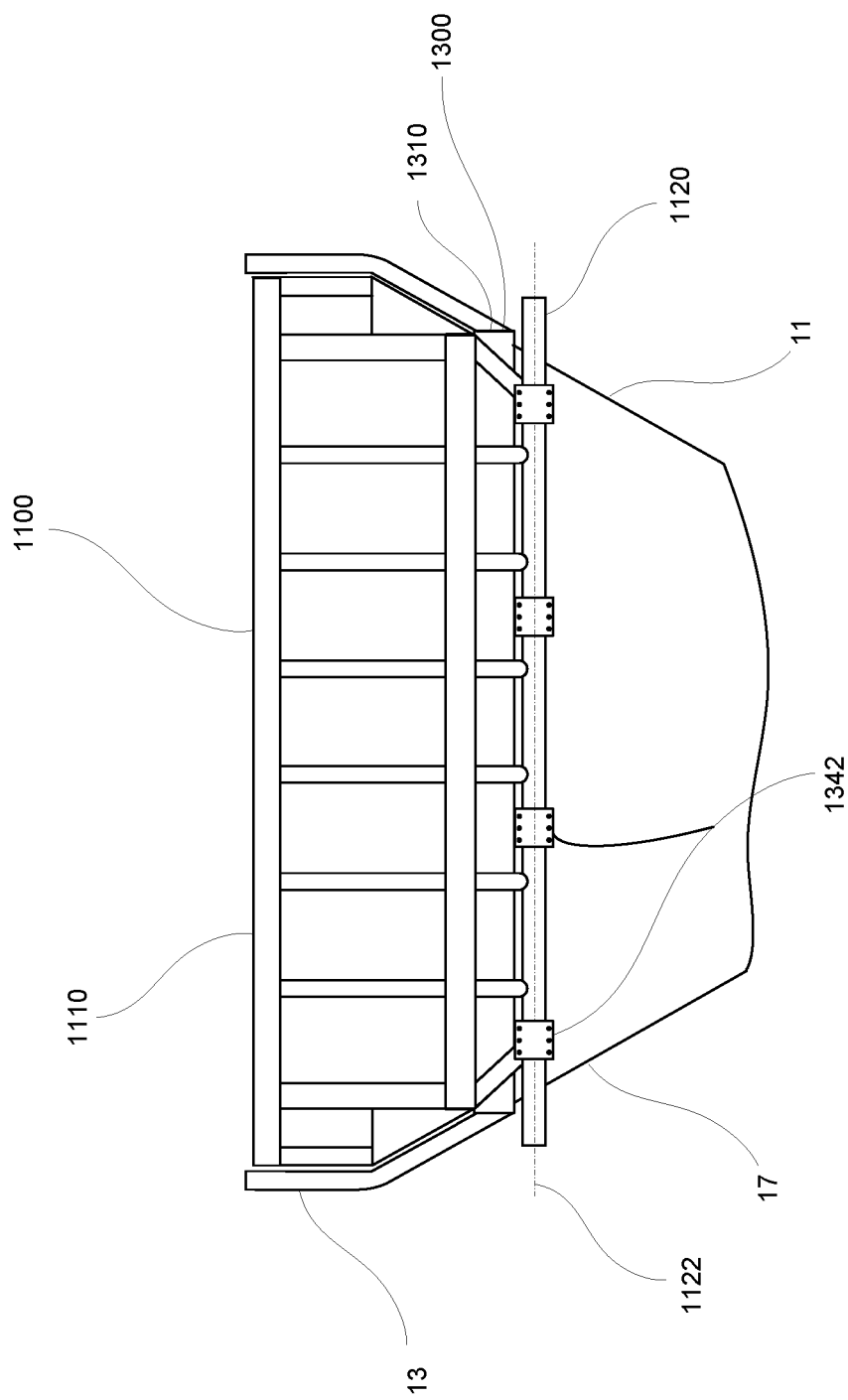
FIG. 18 is a rear view of an installed dump bed extension and tailgate according to an embodiment of the invention.
Figure 19:
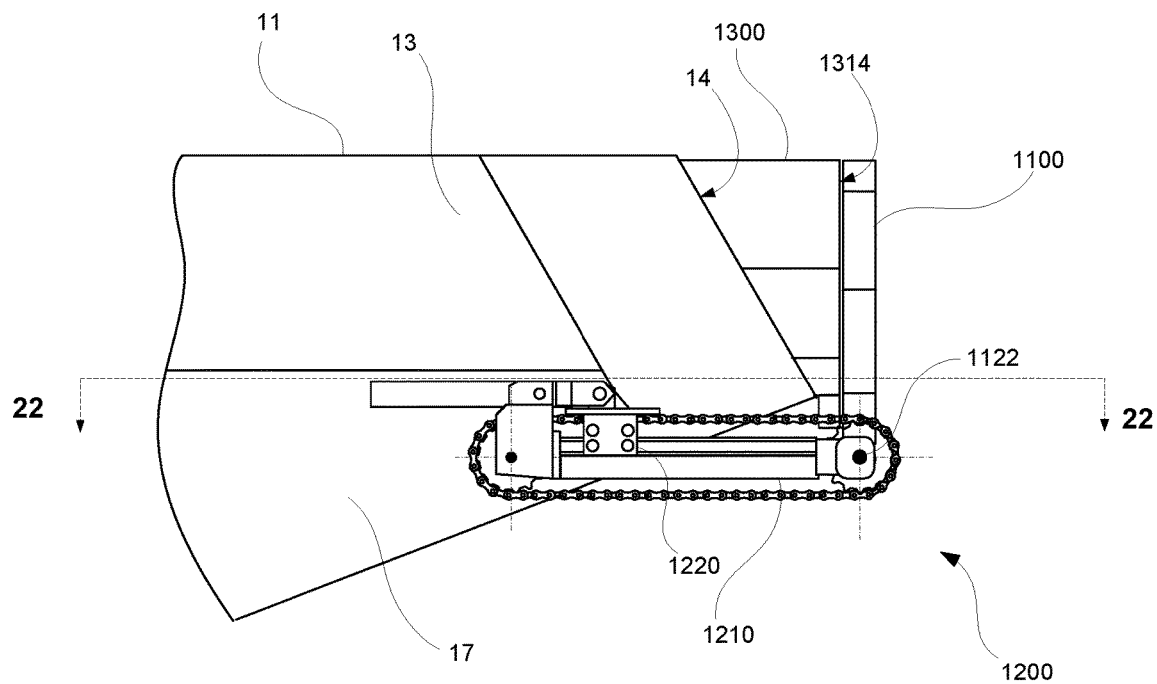
FIG. 19 is a side view of an installed dump bed extension and rotatable tailgate assembly according to an embodiment of the invention wherein the tailgate is in an closed position.
Figure 20:
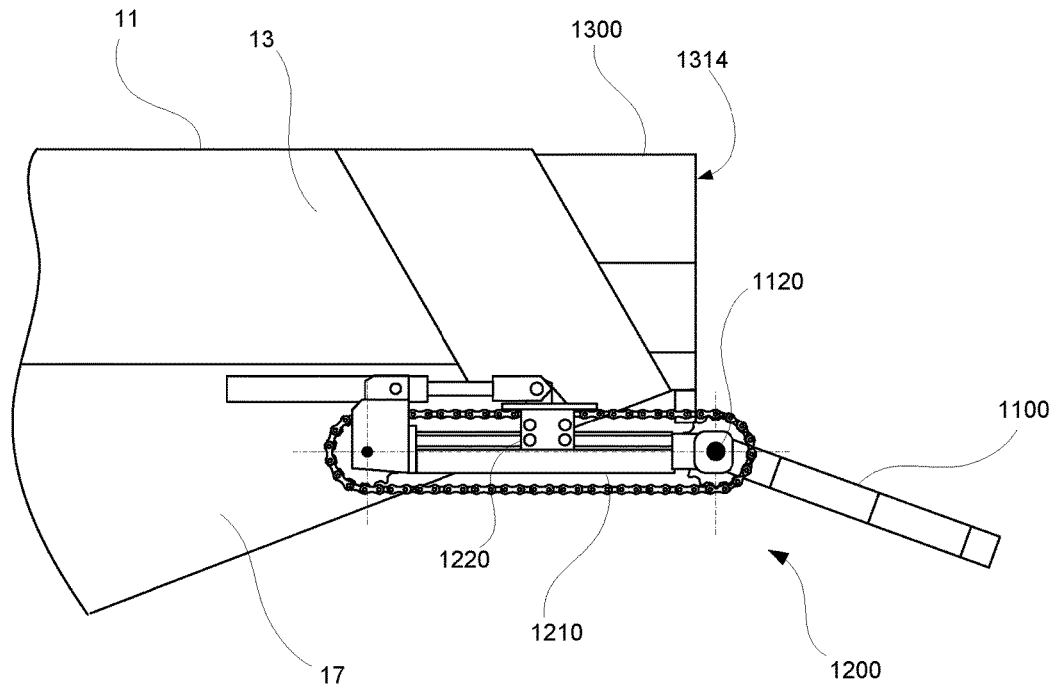
FIG. 20 is a side view of an installed dump bed extension and rotatable tailgate assembly according to an embodiment of the invention wherein the tailgate is in an open position.
Figure 21:
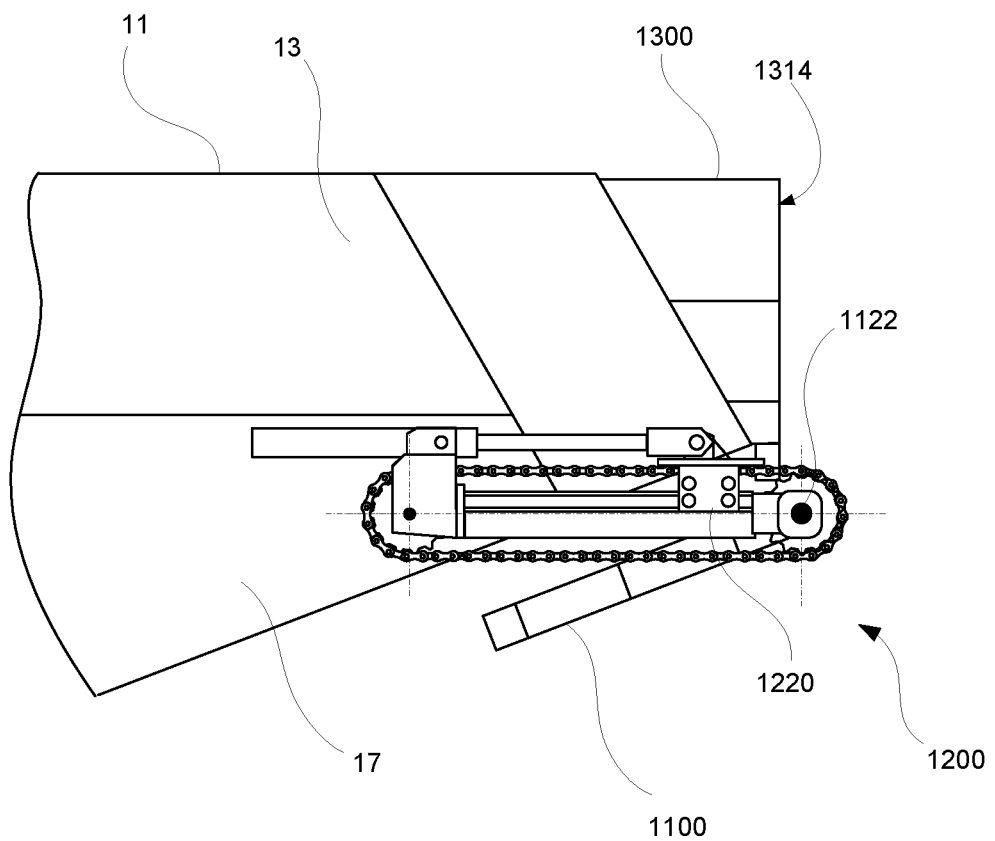
FIG. 21 is a side view of an installed dump bed extension and rotatable tailgate assembly according to an embodiment of the invention wherein the tailgate is in a stowed position.

The above-described embodiment shows the use of the invention in conjunction with an essentially unmodified dump bed 11. The invention may also encompass in combination or be used in conjunction with a dump bed extension. With reference to FIGS. 14-17, a dump bed extension 1300 for use in conjunction with embodiments of the invention is configured for insertion into the back end of a dump bed 11 through the rear opening 14. The dump bed extension 1300 comprises a floor plate 1312 configured to be bolted or welded to the floor of the dump bed 11. Lower and upper side panels 1320, 1330 are configured to conform to the inside of the side panels 13 of the dump bed 11 and extend rearwardly there-from to increase the volume 12 of the dump bed 11. The dump bed extension may further comprise an adaptor plate 1310 to which tailgate bearing support blocks 1340 are attached. The support blocks 1340 are configured for attachment of bearings 1342 to which the shaft 1120 of a tailgate 1100 may be rotatably mounted as shown in FIG. 18.

When mounted to the dump bed 11, the dump bed extension 1300 establishes a new rear opening 1314 for the dump bed 11 that is further back than the original opening and which may be substantially vertical to maximize load capacity. As shown in FIG. 18, the tailgate 1100 may be configured to match the geometry of the dump bed extension 1300 and the extended dump bed opening 1314.

Figure 22:
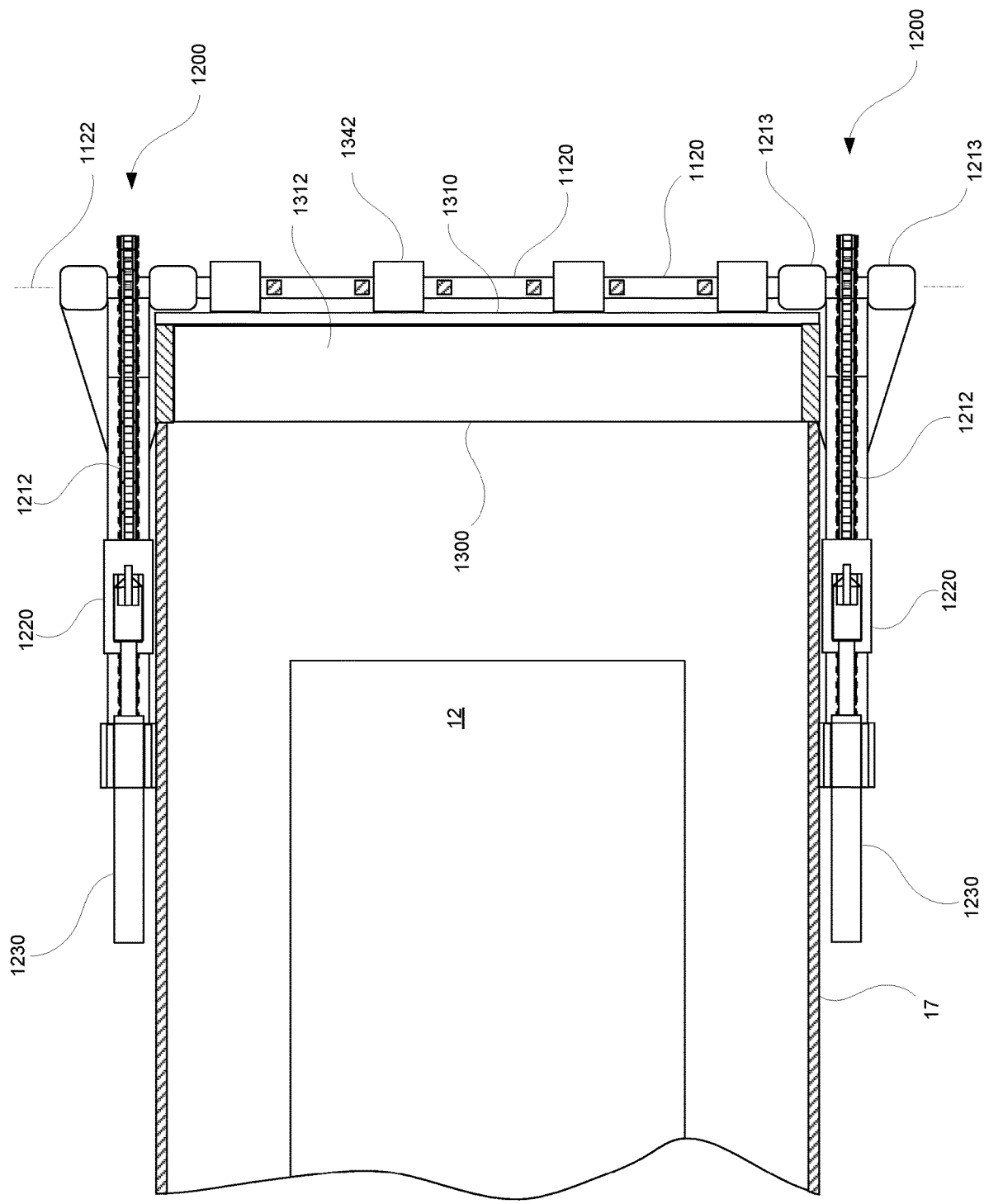
FIG. 22 is a top section view of an installed dump bed extension and rotatable tailgate assembly according to an embodiment of the invention wherein the tailgate is in a closed position.

The previously described rotation actuators 1200 may be used in conjunction with the tailgate 1100, support members 1210, and dump bed extension 1300 as shown in FIGS. 19-22. Operation of the rotation actuators 1200 and resulting rotation of the tailgate 1100 is substantially similar to that described above for use with the unmodified dump bed 11 with the main difference being that the initial closed position of the tailgate 1100 is substantially vertical with the tailgate closing off the revised dump bed opening 1314. FIG. 22 shows a top view of the installed actuators 1200 and the dump bed extension 1300 sectioned through the tailgate 1100 for clarity.

Figure 23:
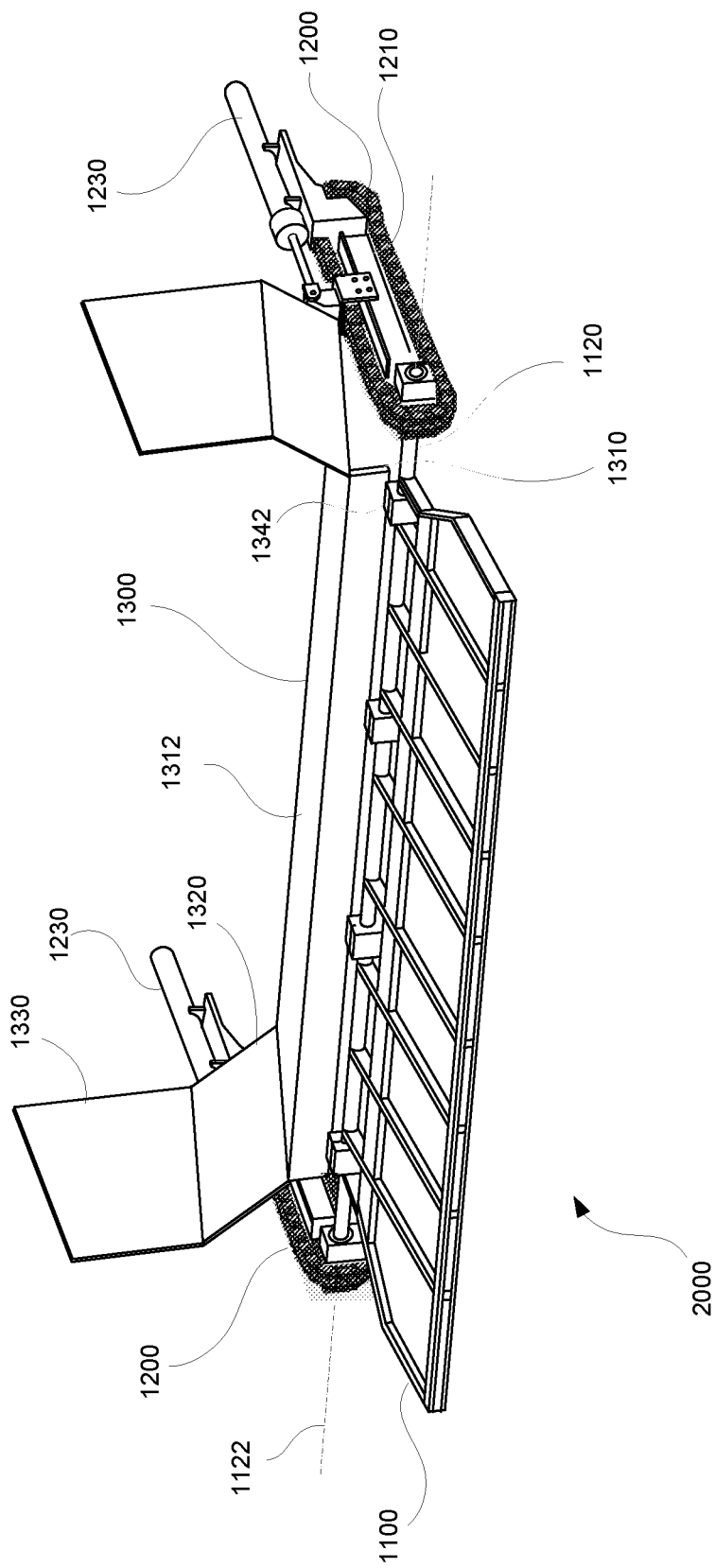
FIG. 23 is a perspective view of a dump bed extension module according to an embodiment of the invention.

With reference to FIG. 23, another exemplary embodiment of the invention provides a combined dump bed extension and tailgate module 2000 that incorporates the previously described dump bed extension 1300, tailgate 1100 and two rotation actuators s 1200 into a single unit that may be permanently, semi-permanently, or removably installed on the dump bed 11 of a truck 10.

Any of the embodiments described herein may include a locking mechanism for preventing undesired rotation of the tailgate 1100 from its closed position. FIGS. 24 and 25 illustrate an exemplary locking system 1400 that comprises a latch bar 1410 rotatably attached at one end to the dump bed 11 or the dump bed extension 1300 (as shown in in the illustrated embodiment) by a hinge pin 1412. The latch bar 1410 has at its other end a pin engaging member 1414, which may be a hook or other engagement device, configured for engaging a latch pin 1420 attached to the tailgate 1100. A hydraulic or other linear actuator 1430 is pivotably attached at one end to the dump bed 11 or the dump bed extension 1300 (as shown in in the illustrated embodiment) by an actuator pin 1432 and at its other end to the latch bar 1410. The linear actuator 1430 is configured so that when retracted it maintains the latch bar 1410 in a locked position wherein it engages the tailgate latch pin 1420 when the tailgate is in its closed position. This engagement prevents the tailgate 1100 from rotating about the tailgate axis 1122. Hydraulic cylinder locking valves may be used to keep tension on the latch pin 1430 while hauling. When the operator desires to unlock the tailgate 1100, the actuator 1430 may be extended, thereby causing the latch bar 1410 to rotate out of engagement with the latch pin 1420 and releasing the tailgate 1100 for rotation. In a preferred embodiment, a locking assembly 1400 is provided on each side of the dump bed 11. When the truck is loaded, the tailgate 1100 is locked. When the truck is ready to dump, the tailgate 1100 is unlocked.

While the present invention has been described here in detail in relation to certain embodiments, it is to be understood that this disclosure is only illustrative and exemplary of the present invention and is made merely for the purposes of providing a full and enabling disclosure of the invention. Many modifications to the embodiments described above can be made without departing from the spirit and scope of the invention. Accordingly, the foregoing disclosure is not intended to be construed or to limit the present invention or otherwise to exclude any other such embodiments, adaptations, variations, modifications and equivalent arrangements.

What is claimed is:

1. A rotatable tailgate assembly for installation on a dump bed having a floor and first and second sides with rear edges collectively defining a rear dump bed opening, the tailgate assembly comprising:
    first and second support members each having an attachment end attachable to a one of the respective sides of the dump bed when the tailgate assembly is in an installed condition and a free end extending rearwardly past the dump bed opening when the tailgate assembly is in said installed condition, each support member having at least one bearing attached to the support member adjacent said free end;
    a tailgate comprising
        a cylindrical tailgate shaft having a first end rotatably received within the at least one bearing of the first support member, a second end rotatably received within the at least one bearing of the second support member, and a lengthwise shaft axis extending through the first and second shaft ends, and
        a closure portion attached to and extending radially away from the tailgate shaft, the closure portion being configured for engaging the rear edges of the dump bed floor and sides to close off the dump bed opening when the tailgate assembly is in the installed condition and the tailgate is in a closed rotational position; and
    a first rotation actuator mounted to a first one of the first and second support members and operatively connected to the tailgate shaft for selective rotation thereof.

2. A rotatable tailgate assembly according to claim 1 wherein when the tailgate assembly is in the installed condition, the tailgate shaft and tailgate are rotatable by the rotation actuator between the closed rotational position and an open rotational position in which the tailgate closure portion is rotationally spaced apart from the dump bed opening.

3. A rotatable tailgate assembly according to claim 1 wherein when the tailgate assembly is in the installed condition, the tailgate shaft and tailgate are rotatable by the rotation actuator between the closed rotational position and a fully open rotational position, wherein an angle between the closed rotational position and the fully open rotational position is greater than 180 degrees.

4. A rotatable tailgate assembly according to claim 3 wherein the angle is greater than or equal to 270 degrees.

5. A rotatable tailgate assembly according to claim 1 wherein when the tailgate assembly is in the installed condition, the tailgate shaft and tailgate are rotatable by the rotation actuator between the closed rotational position and a stowed rotational position wherein the tailgate closure portion is beneath the dump bed.

6. A rotatable tailgate assembly according to claim 1 further comprising:
    a second rotation actuator mounted to a second one of the first and second support members and operatively connected to the tailgate shaft for rotation thereof in cooperation with the first rotation actuator.

7. A rotatable tailgate assembly according to claim 1 wherein the rotation actuator comprises:
    a drive gear attached to the tailgate shaft;
    an idler mounted to the first one of the first and second support members;
    a drive chain mounted to the drive gear and the idler; and
    a drive chain actuator configured to selectively rotate the drive chain, thereby causing rotation of the drive gear and the tailgate shaft.

8. A rotatable tailgate assembly according to claim 7 wherein the drive chain actuator comprises:
    a carriage attached to the drive chain;
    a carriage track on the first one of the first and second support members; and
    a linear actuator having an actuator body attached to the first one of the first and second support members and an extendible actuator rod having a rod end attached to the carriage.

9. A rotatable tailgate assembly according to claim 8 wherein the carriage track is a structural part of the first one of the first and second support members.

* * * * *